United States Patent Office 2,705,185
Patented Mar. 29, 1955

2,705,185

PROCESS FOR THE MANUFACTURE OF MAGNESIUM CHLORIDE

Jonas Kamlet, Easton, Conn., assignor, by mesne assignments, to The Kamlet Laboratory, New York, N. Y., a partnership No Drawing. Application August 9, 1952, Serial No. 303,619

4 Claims. (Cl. 23—91)

This invention relates to a process for the manufacture of magnesium chloride. More particularly, it relates to a process for the manufacture of magnesium chloride from dolomite, dolomitic limestone or magnesite, with ordinary salt and gypsum, anhydrite or by-product calcium sulfate as the primary raw materials. It has for its purpose to provide a simple process whereby calcined dolomite, dolomitic limestone or magnesite may be reacted with salt (sodium chloride) in the presence of gypsum, anhydrite or by-product calcium sulfate, to obtain a magnesium chloride solution as the primary end-product with salt cake (anhydrous $Na_2SO_4$) or Glauber's salt ($Na_2SO_4.10H_2O$) and precipitated calcium carbonate as valuable and readily salable by-products. It has for its further purpose to provide an efficient process for the utilization of low-grade deposits of gypsum and anhydrite and the calcium sulfate which is obtained as a by-product or waste product of many chemical processes, in the manufacture of magnesium chloride, with salt cake and precipitated chalk being obtained as by-products. Huge quantities of calcium sulfate are obtained as by-products or waste products in chemical plants throughout the world, and their disposal often represents a serious problem. It is also interesting to note that the raw materials of this process—dolomite, salt and anhydrite or gypsum—often occur as alternating geological strata in the vicinity of sulfur domes, as for instance, in the area adjacent to the Gulf of Mexico in the United States.

The raw materials of this process are:

(a) Dolomite (a mineral corresponding in composition to the double salt $MgCO_3.CaCO_3$), dolomitic limestone (dolomite containing more $CaCO_3$ than is found in true dolomite; this is often referred to as high-magnesia limestone), magnesite ($MgCO_3$) and low-grade calciferous magnesites (i. e. magnesites containing some $CaCO_3$, but not sufficient to be considered dolomitic);

(b) Salt, ordinary sodium chloride, as crystal or rock salt, or as a saline brine;

(c) Gypsum (a mineral corresponding in composition to $CaSO_4.2H_2O$, also occurring in nature as alabaster, selenite, alba, mineral white, satin spar and light spar), anhydrite (a mineral corresponding in composition to anhydrous calcium sulfate, which often occurs associated with gypsum deposits and is usually discarded since it has heretofore had little or no commercial value), and by-product calcium sulfate. Many industrial chemical processes yield calcium sulfate as by-product or waste product. Huge dumps of such waste calcium sulfate are to be found near most plants employing the "wet" process for the manufacture of phosphoric acid and phosphates from phosphate rock, from the manufacture of oxalic acid and oxalates, from the neutralization of waste pickle liquors from steel mills and tinplating operations, from the waste products of the titanium dioxide industry, from the manufacture of citric acid, from the processing of gypsum and plaster of Paris compositions, from the alkali fusion processes for the manufacture of phenol and beta-naphthol, and from many other industrial chemical processes.

The present invention is based on the finding that the following reactions can be made to proceed to give an excellent yield of magnesium chloride and the concomitant by-products:

$Mg(OH)_2 + CaSO_4 + 2NaCl + CO_2 \rightarrow$
$MgCl_2 + Na_2SO_4 + CaCO_3 + H_2O$
$MgO + CaSO_4 + 2NaCl + CO_2 \rightarrow MgCl_2 + Na_2SO_4 + CaCO_3$ This invention may best be understood by a seriatim explanation of each step involved.

STEP I

The dolomite, dolomitic limestone or magnesite raw material is calcined in the usual manner in stationary or rotary kilns to yield a magnesium oxide-containing calcine. If dolomite or dolomitic limestone is employed, this may be either half-burned or dead-burned. Half-burned dolomite or dolomitic limestone is calcined at a temperature sufficient only to decompose the $MgCO_3$ into $MgO$ and $CO_2$, but insufficient to decompose the $CaCO_3$ (e. g. 750°–1000° C.) Thus, half-burned dolomitic lime contains magnesium oxide and calcium carbonate as major components. Dead-burned dolomite and dolomitic limestone is calcined at a temperature sufficient to decompose both the $MgCO_3$ and the $CaCO_3$ into $MgO$, $CaO$ and $CO_2$ (e. g. 1400°–1600° C.). Thus, dead-burned dolomite or dolomitic lime contains $MgO$ and $CaO$ as major components.

STEP II

The calcined dolomite or magnesite is now made into an aqueous slurry with the theoretical amount of gypsum, anhydrite or calcium sulfate (the $CaSO_4$-containing material being ground to a fineness of at least 100 mesh, and preferably finer), and salt (or saline brine). A quantity of the calcined dolomite or magnesite is taken containing 40.3 parts by weight of $MgO$ (1 mole) per 136.1 parts of $CaSO_4$ (1 mole) and 116.9 parts of sodium chloride (2 moles). On slurrying, the calcined minerals, the magnesium oxide contained therein will be partially hydrated to magnesium hydroxide and will partially remain as magnesium oxide. The calcium oxide will be completely and rapidly hydrated to calcium hydroxide. Any calcium carbonate present (as in half-burned dolomite or dolomitic limestone) will remain as an insoluble, granular precipitate, largely dispersed by the disruptive action of the water on the magnesium oxide.

The resultant slurry (i. e. $MgO$, $Mg(OH)_2$, $Ca(OH)_2$ and $CaSO_4$ in suspension, $NaCl$ in solution) is now carbonated. This may be done cheaply and easily by transferring the slurry to an open reaction vessel, pumping gases containing carbon dioxide through the bottom of the vessel (as, for instance, through spargers or diffuser plates) so that they bubble through the slurry. Such gases may be as dilute as 2% $CO_2$ and as concentrated as 100% $CO_2$. For instance, stack gases from a boiler plant containing from 8% to 12% of $CO_2$ are entirely suitable and may be used if available. Similarly, rotary kiln by-product gases containing 30%–40% of $CO_2$ may be used with equally good results.

The temperature of the carbonation may vary quite widely. Thus, the slurry may be carbonated at a temperature of 5° C. to 30° C. until a quantity of carbon dioxide has been absorbed sufficient to convert all of the $Mg(OH)_2$ and $MgO$ to $MgCO_3$ or $Mg(HCO_3)_2$, and all of the $Ca(OH)_2$ to $CaCO_3$, and the temperature of the reaction mixture may then be raised to between 40° C. and the boiling point of the slurry until the reaction has gone to completion. If the cold solution is overcarbonated and some or all of the magnesium carbonate is converted to soluble magnesium bicarbonate, the latter reverts to $MgCO_3.3H_2O$ on the subsequent heating of the reaction mixture.

Alternatively, the slurry of $MgO$, $Mg(OH)_2$, $CaSO_4$ and $NaCl$ may be heated to between 40° C. and the boiling point of the slurry, and carbonated within that temperature range. The reaction is complete when substantially all of the calcium ion is present as insoluble calcium carbonate and substantially all of the magnesium ion is present as soluble magnesium chloride.

It is important to note that the use of finely ground magnesium carbonate-containing minerals (such as dolomite, dolomitic limestone and magnesite) in this reaction has proven unfeasible. Magnesium carbonate in almost all of its natural forms and in the form of most of its hydrates and double salts is much too unreactive to partake satisfactorily in the reaction of the present invention. In addition, $MgCO_3.3H_2O$ occurs in nature as the mineral nesquehonite and $MgCO_3.5H_2O$ occurs as the mineral lansfordite. Both of these are less suitable in the process of the present invention than the magnesium carbonate formed, often ephemerally, by the carbonation of the MgO and Mg(OH)$_2$. The existence of the magnesium carbonate is ephemeral when it is permitted to react immediately in situ with the CaSO$_4$ and the NaCl to form MgCl$_2$, Na$_2$SO$_4$ and CaCO$_3$, especially at advanced temperatures. Depending on the duration and temperature of the carbonation, the MgO and Mg(OH)$_2$ in the slurries may be converted to MgCO$_3$.3H$_2$O or to soluble Mg(HCO$_3$)$_2$. Both of these latter compounds are suitable for use in the process of the present invention. Thus, it is entirely feasible to effect this process by slurrying calcined dolomite, dolomitic limestone or magnesite with water, carbonating the said slurry until all of the magnesia has been converted to MgCO$_3$.3H$_2$O or soluble Mg(HCO$_3$)$_2$ or to mixtures of both. Thereafter, the requisite amount of finely ground CaSO$_4$-containing raw material and the requisite amount of salt are added and the reaction mixture is heated at a temperature between 40° C. and the boiling point of the slurry to carry the reaction to completion.

To summarize, the magnesium carbonate which putatively takes part in the reaction of this invention must be made via the carbonation of a slurry of MgO and Mg(OH)$_2$. Of course, any Ca(OH)$_2$ present in the said slurry is completely converted to insoluble CaCO$_3$ by the process of carbonation. The reaction may be effected at atmospheric or superatmospheric pressures, although little or no advantage may be derived by operating at pressures higher that atmospheric.

Almost all dolomites, dolomitic limestones and magnesites contain minor amounts of silica and iron oxides. During calcining, the silica is converted to a dense insoluble calcium silicate and the iron oxide is agglomerated to a dense granular form. Thus, if the carbonation is effected in a reactor with a conical bottom, the insoluble calcium silicates and iron oxides will settle at the bottom of the cone. This sediment may then be removed through a vent and discarded prior to the filtration of the reaction mixture. The insoluble calcium carbonate, being much lighter than the sediment, will remain suspended in the slurry, whereas the impurities will settle to the conical bottom and can easily be decanted off.

When the reaction represented by the equations:

$$MgO + CaSO_4 + 2NaCl + CO_2 \rightarrow MgCl_2 + CaCO_3 + Na_2SO_4$$

$$Mg(OH)_2 + CaSO_4 + 2NaCl + CO_2 \rightarrow MgCl_2 + CaCO_3 + Na_2SO_4 + H_2O$$

$$Ca(OH)_2 + CO_2 \rightarrow CaCO_3 + H_2O$$

is completed, the reaction mixture is passed to the next step of the process.

STEP III

The hot reaction mixture is filtered from the insoluble precipitate of calcium carbonate. Since this calcium carbonate is in a very finely divided state, with a uniform particle distribution, and is made, in effect, by the carbonation of the equivalent of a lime slurry, it may be washed and dried, and is thereafter ideally suited for use as precipitated chalk, in the cosmetic dentifrice industries, as a pigment and filler in the manufacture of paper, in the formulation of rubber compositions.

The filtrate (now containing MgCl$_2$ and Na$_2$SO$_4$) is concentrated (preferably under reduced pressure), or refrigerated, or both, to a point where the sodium sulfate may be crystallized out. By operating the carbonation of the slurry in comparatively concentrated slurries, the amount of concentration may be kept to a minimum or largely obviated. As is well known, if sodium sulfate is crystallized from solution above 35° C., it is recovered as anhydrous sodium sulfate (salt cake). Below 32° C., sodium sulfate will crystallize from aqueous solutions as Na$_2$SO$_4$.10H$_2$O (Glauber's salt). Both salt cake and Glauber's salt have large industrial applications in the chemical and related industries and represent valuable by-products of this process. Salt cake and Glauber's salts are used in the manufacture of glass, pulp and paper, pigments, dyestuffs, synthetic detergents, in the printing and dyeing of textiles, in the recovery of alumina from bauxites and high-alumina clays, in the manufacture of sulfur dioxide and of sulfuric acid, et cetera.

After the crystallization of the major portion of the sodium sulfate, the mother liquor now comprises a concentrated solution of MgCl$_2$ containing minor amounts of residual Na$_2$SO$_4$. If desired, the latter may be removed by the addition to the mother liquor of a small amount of calcium chloride stoichiometrically equivalent to the sodium sulfate present. The following reaction occurs:

$$Na_2SO_4 + CaCl_2 \rightarrow CaSO_4 + 2NaCl$$

The NaCl formed is insoluble in (or "salted out" by) the concentrated MgCl$_2$ solution, and precipitates from the solution together with the insoluble CaSO$_4$. The insoluble precipitate is filtered off and the filtrate, a relatively pure MgCl$_2$ solution is now processed further for the recovery of crystalline magnesium chloride hydrates, anhydrous magnesium chloride or other chemical values.

Thus, the solution may be concentrated to about 25% MgCl$_2$ content and MgCl$_2$.6H$_2$O crystallized therefrom. The MgCl$_2$.6H$_2$O can thereafter be dehydrated stepwise to MgCl$_2$.2H$_2$O in a hot-air oven or a muffle furnace and finally to anhydrous MgCl$_2$ in a rotary kiln or by any other convenient procedure described in the art, e. g. Gann, Ind. Eng. Chem., 22, 694 (1930).

Alternatively, the MgCl$_2$ solution may be used for the manufacture of high purity MgO and other magnesium salts. Thus, if the solution of MgCl$_2$ is reacted further with an additional quantity of milk of dolomitic lime, but in such proportions that one mole of Ca(OH)$_2$ in the lime is used per one mole of MgCl$_2$ in the solution, the following reaction occurs:

$$MgCl_2 + [Ca(OH)_2 + xMg(OH)_2] \longrightarrow CaCl_2 + (1+x)Mg(OH)_2$$
Milk of dolomitic lime Thus, part of the Mg(OH)$_2$ obtained (1 mole) is derived from the MgCl$_2$ and the remainder ($x$ moles) is derived from the dolomitic lime used. The insoluble Mg(OH)$_2$ is filtered off, washed, dried and calcined to obtain a pure magnesium oxide of the desired density, by the technics well known in the art.

Alternatively, the Mg(OH)$_2$ filter cake may be used in the well-known Pattinson carbonation process to obtain basic magnesium carbonate (approximately $$4\tfrac{1}{2}MgCO_3.Mg(OH)_2.4\tfrac{1}{2}H_2O)$$

which is very extensively used in the manufacture of fireproof and heat insulating asbestos compositions, in the manufacture of magnesium citrate, for clarifying liquids by filtration, in dentifrices and cosmetics, in polishing compositions, pigments, paper, as a filler in rubber, etc.

Alternatively, the Mg(OH)$_2$ filter-cake may be employed in the manufacture of other magnesium compounds, and as an intermediate in the various processes for the manufacture of magnesium metal.

It is obvious that the other alkali metal chloride (such as potassium chloride) may be used in the process of the present invention, in which case the corresponding alkali metal sulfate (e. g. potassium sulfate) is obtained as a by-product. It is therefore desired that this invention be construed to include the use of such other alkali metal chlorides in the process described and claimed herein.

The following examples are given to define and to illustrate the present invention but in no way to limit it to the reagents, proportions or conditions described therein. Obvious modifications will occur to any person skilled in the art. All proportions given are parts by weight.

*Example 1*

108 parts of dead-burned dolomite lime containing 37.5% of MgO (1 mole MgO) is made into a slurry with 200 parts of a filter-cake of a by-product calcium sulfate containing 70% actual CaSO$_4$ (1 mole CaSO$_4$), 500 parts of 23.5% NaCl solution (2 moles NaCl) and sufficient water to permit the slurry to be mixed and carbonated with the equipment available. The slurry is heated to a temperature of 80° to 90° C., agitated and carbonated with kiln gases containing 16% to 20% of CO$_2$, until no more CO$_2$ is absorbed. The reaction is complete when the magnesium ion content in the filtrate no longer increases, i. e. when substantially all of the magnesium is present as MgCl$_2$. The hot reaction mixture is then filtered from insoluble CaCO$_3$. The CaCO$_3$ filter-cake may be washed, dried and milled to obtain a grade of precipitated chalk suitable for industrial use.

The hot filtrate is now concentrated under reduced pressure to incipient crystallization of the sodium sulfate, and is then cooled to a temperature not below 35° C. to permit crystallization of the sodium sulfate as the anhydrous salt cake. After filtering or centrifuging off the salt cake, the filtrate is analyzed for residual $Na_2SO_4$ content and 0.8 parts of $CaCl_2$ are added per 1.0 part of residual $Na_2SO_4$ present. The combined precipitates of $CaSO_4$ and NaCl which forms are filtered off. The filtrate now comprises a relatively pure $MgCl_2$ solution which may be crystallized and dehydrated in the usual manner, or used (as described above) for the manufacture of magnesium oxide, by further reaction with milk of dolomitic lime. A typical materials balance for this process may be given as follows:

(a) When the process is operated to prepare magnesium chloride::
   1900 lbs. dolomite
   1400 lbs. calcium sulfate or anhydrite or 1800 lbs. gypsum
   1200 lbs. salt
   will yield
   450 lbs. anhydrous magnesuim chloride
   2000 lbs. precipitated calcium carbonate
   1200 lbs. salt cake (b) When the process is operated to prepare magnesium oxide:
   3800 lbs. dolomite
   1400 lbs. calcium sulfate or anhydrite or 1800 lbs. gypsum
   1200 lbs. salt
   will yield
   800 lbs. magnesium oxide
   2000 lbs. precipitated calcium carbonate
   1200 lbs. salt cake
   1100 lbs. calcium chloride (in solution).

Example II 135 parts of a half-burned high-magnesia limestone (dolomite limestone) containing 30% of MgO (1 mole MgO), 120 parts of techn. rock salt (2 moles NaCl) and 140 parts of anhydrite (1 mole $CaSO_4$) ground to 200 mesh fineness and 1000 parts of water are carbonated with a stack gas containing 8% to 10% of $CO_2$, at a temperature of 20°–30° C. until no more $CO_2$ is absorbed. The reaction mixture is then heated for 5 to 6 hours at 90°–100° C., with good agitation, until the reaction is completed, i. e. all of the magnesium ion is present as soluble magnesium chloride. The reaction mixture is now treated as described in Example I to recover $MgCl_2$, salt cake and calcium carbonate.

Example III 44 parts of a calcined magnesite containing 92% of MgO (1 mole MgO) is made into a slurry with 1000 parts of water and is then carbonated at room temperature with a $CO_2$-containing gas until substantially all of the magnesia has been converted to magnesium carbonate and bicarbonate. To this slurry, add now 120 parts of salt (2 moles NaCl) and 188 parts of gypsum, ground to 200 mesh fineness, containing 136 parts of actual $CaSo_4$. Heat the slurry with good agitation for 5 or 6 hours at 90°–100° C., until the reaction is complete. The reaction mixture is then further processed as described in Example I.

Having described my invention, what I claim and desire to protect by Letters Patent is:

1. A process for the manufacture of magnesium chloride which comprises calcining a member of the group consisting of dolomite, dolomitic limestone and magnesite until at least the magnesium carbonate content thereof has been converted to magnesium oxide, preparing an aqueous slurry of the resultant calcine with a calcium sulfate-containing material and an alkali metal chloride in quantities sufficient to provide at least one mole of calcium sulfate and two moles of alkali metal chloride for every mole of magnesium oxide in the slurry, carbonating the slurry with a carbon dioxide-containing gas at a temperature between 5° C. and the boiling point of the slurry, completing the reaction by heating the reaction mixture at a temperature between 40° C. and the boiling point of the slurry, thereafter filtering off the insoluble calcium carbonate, crystallizing the alkali metal sulfate and separating the crystals from the mother-liquor and thereafter recovering magnesium chloride from the mother-liquor.

2. The process of claim 1 in which the alkali metal chloride is sodium chloride.

3. The process of claim 1 in which the alkali metal chloride is potassium chloride.

4. The process of claim 1 in which the calicum sulfate-containing material is gypsum.

References Cited in the file of this patent

UNITED STATES PATENTS

| | | |
|---|---|---|
| 1,197,512 | Lord | Sept. 5, 1915 |
| 1,537,479 | Lord | May 12, 1925 |
| 1,951,160 | MacMullin | Mar. 13, 1934 |
| 2,393,115 | MacMullin | Jan. 15, 1946 |

FOREIGN PATENTS

| | | |
|---|---|---|
| 569,045 | Great Britain | May 2, 1945 |